(12) United States Patent
Rausch et al.

(10) Patent No.: US 10,395,683 B2
(45) Date of Patent: Aug. 27, 2019

(54) PROCEDURE FOR SETTING LASER AND HEATER POWER IN HAMR DEVICE

(71) Applicant: Seagate Technology LLC, Cupertino, CA (US)

(72) Inventors: Tim Rausch, Farmington, MN (US); Tatsuya Shimizu, Tokyo (JP); Wai Yuen Lai, Tokyo (JP); Kai Chiu Cheung, Tokyo (JP)

(73) Assignees: Seagate Technology LLC, Cupertino, CA (US); SAE Magnetics (Hong Kong) Limited, Shatin, N.T. (HK)

( * ) Notice: Subject to any disclaimer, the term of this patent is extended or adjusted under 35 U.S.C. 154(b) by 0 days.

(21) Appl. No.: 16/136,552

(22) Filed: Sep. 20, 2018

(65) Prior Publication Data
US 2019/0019531 A1 Jan. 17, 2019

Related U.S. Application Data

(63) Continuation of application No. 14/716,148, filed on May 19, 2015, now Pat. No. 10,090,011.

(51) Int. Cl.
*G11B 5/60* (2006.01)
*G11B 5/00* (2006.01)

(52) U.S. Cl.
CPC .......... *G11B 5/607* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,018,672 B2 | 9/2011 | Maeda et al. | |
| 8,477,569 B2 | 7/2013 | Erden et al. | |
| 8,873,353 B1 | 10/2014 | Riddering | |
| 8,922,929 B1 | 12/2014 | Ruan et al. | |
| 9,123,370 B1 * | 9/2015 | Ruan | G11B 5/607 |
| 9,142,244 B2 | 9/2015 | Chu et al. | |
| 9,787,125 B2 | 10/2017 | Ji | |
| 2008/0100950 A1 | 5/2008 | Mitsunaga et al. | |
| 2010/0128383 A1 | 5/2010 | Matsushita et al. | |
| 2013/0293984 A1 | 11/2013 | Poss et al. | |
| 2014/0334275 A1 | 11/2014 | Zheng et al. | |

OTHER PUBLICATIONS

International Search Report and Written Opinion dated Aug. 24, 2016 from PCT/US2016/033188, 8 pages.
Zhang et al., "Ultra-compact and highly efficient silicon polarization splitter and rotator", Apl Photonics 1, 2016, 6 pages.

* cited by examiner

*Primary Examiner* — K. Wong
(74) *Attorney, Agent, or Firm* — Hollingsworth Davis, LLC

(57) ABSTRACT

A heater power of a heat-assisted magnetic recording head is set based on an initial head-medium clearance estimate in response to the heater power. For a plurality of iterations, an optimum laser power of the recording head is determined and a heater power is set for a next iteration that results in an optimum heater power for the optimum laser power. If differences in the heater and laser powers between two subsequent iterations are below thresholds, the iterations are stopped and the optimum heater power and the optimum laser power for one of the subsequent iterations are used as an operational heater power and an operational laser power.

20 Claims, 4 Drawing Sheets

PROCEDURE FOR SETTING LASER AND HEATER POWER IN HAMR DEVICE

RELATED PATENT DOCUMENTS

This application is a continuation of U.S. application Ser. No. 14/716,148 filed on May 19, 2015, which is incorporated herein by reference in its entirety.

SUMMARY

The present disclosure is directed to setting of laser and heater power in a heat-assisted magnetic recording device. In one embodiment, a method involves setting a heater power of a heat-assisted magnetic recording head based on an initial head-medium clearance estimate in response to the heater power. For a plurality of iterations, an optimum laser power of the recording head is determined based on writing data to at least one track of a recording medium at the heater power. For each iteration, an additional heater power is applied to approach or cause a head-medium contact at the optimum laser power and, based on the value of the additional heater power, the heater power is set for a next iteration that results in an optimum heater power for the optimum laser power. If a first difference in the heater power between two subsequent iterations is below a first threshold and a second difference in the optimum laser power between the two subsequent iterations is below a second threshold, the iterations are stopped and the heater power and the optimum laser power for one of the two subsequent iterations are used as an operational heater power and an operational laser power for the heat-assisted magnetic recording head.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to detection and control of head-media spacing in data storage devices and the setting of the operational laser power in a heat assisted magnetic recording device (HAMR). The detection of head-to-media spacing becomes more challenging in what are referred to as heat-assisted magnetic recording devices. This technology, also referred to as energy-assisted magnetic recording (EAMR), thermally-assisted magnetic recording (TAMR), and thermally-assisted recording (TAR), uses an energy source such as a laser to heat a small spot on a magnetic disk during recording. The heat lowers magnetic coercivity at the spot, allowing a write transducer to change magnetic orientation. Due to the relatively high coercivity of the medium after cooling, the data is less susceptible to paramagnetic effects that can lead to data errors.

Generally, recording heads may utilize heaters for fine control of head-to media spacing. The heaters heat a portion of the recording head that faces the recording medium. The heating causes a local protrusion due to thermal expansion of the material. Thermal protrusion can be finely controlled to maintain a desired clearance between read/write transducers and the recording medium. As will be explained in greater detail below, the introduction of a HAMR energy source to the read/write head can complicate the control of head-to-media spacing. Further, while conventional read/write heads may be allowed to contact the recording medium under some conditions, a HAMR device may be damaged if such contact occurs while recording. This can make the estimation and control of head-to-media spacing more difficult in a HAMR recording head.

Figure 1:
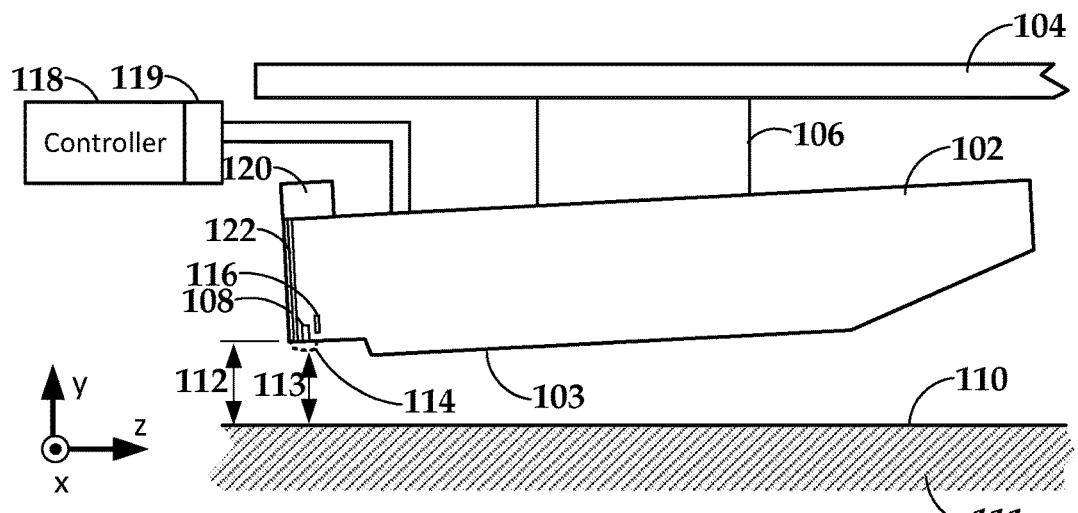
FIG. 1 is a block diagram of a hard drive slider and media arrangement according to an example embodiment.

In reference now to FIG. 1, a block diagram shows a side view of a read/write head 102 according to an example embodiment. The read/write head 102 may be used in a magnetic data storage device, e.g., hard drive. The read/write head 102 may also be referred to herein as a slider, read head, recording head, etc. The read/write head 102 is coupled to an arm 104 by way of a suspension 106 that allows some relative motion between the read/write head 102 and arm 104. The read/write head 102 includes read/write transducers 108 at a trailing edge that are held proximate to a surface 110 of a magnetic recording medium 111, e.g., magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

It is desirable to maintain a predetermined slider flying height 112 over a range of disk rotational speeds during both reading and writing operations to ensure consistent performance. Region 114 is a "close point" of the read/write head 102, which is generally understood to be the closest point of contact between the read/write transducers 108 and the magnetic recording medium 111, and generally defines the head-to-media spacing 113. To account for both static and dynamic variations that may affect slider flying height 112, the read/write head 102 may be configured such that a region 114 of the read/write head 102 can be configurably adjusted during operation in order to finely adjust the head-to-media spacing 113. This is shown in FIG. 1 by dotted line that represents a change in geometry of the region 114. In this example, the geometry change may be induced, in whole or in part, by an increase or decrease in temperature of the region 114.

To provide dynamic control of head-to-media spacing 113 via heat, the read/write head 102 may include (or otherwise be thermally coupled to) one or more heating elements 116. The heating element 116 (e.g., resistance heater) may be provided with selectable amounts of power by a controller 118. An increase or decrease in current causes and increase or decrease in the temperature of the heating element 116, which results in expansion or contraction at the media-facing surface 103.

In addition to controlling the heating element 116, the controller 118 includes logic circuitry for controlling other functions of a data storage apparatus. The data storage apparatus includes at least the read/write head 102 and recording medium 111, and may include other components not shown, such as spindle motor, arm actuator, power supplies, etc. The controller 118 may include or be coupled to interface circuitry 119 such as preamplifiers, buffers, filters, digital-to-analog converters, analog-to-digital converters, etc., that facilitate electrically coupling the logic of the controller 118 to the analog signals used by the read/write head 102 and other components not shown.

Other elements of the read/write head 102 may also provide heat besides or in addition to the heating element 116. For example, a write coil of the read/write transducers 108 may generate sufficient heat to cause configurable deformation of region 114. This deformation will only occur when the coil is energized, e.g., when data is being written. Further, the illustrated read/write head 102 is configured as a HAMR recording head, which includes additional components that generate heat near the read/write transducer 108. These components include laser 120 (or other energy source) and waveguide 122. The waveguide 122 delivers light from the laser 120 to components near the read/write transducers 108. These components are shown in greater detail in FIG. 2.

Figure 2:
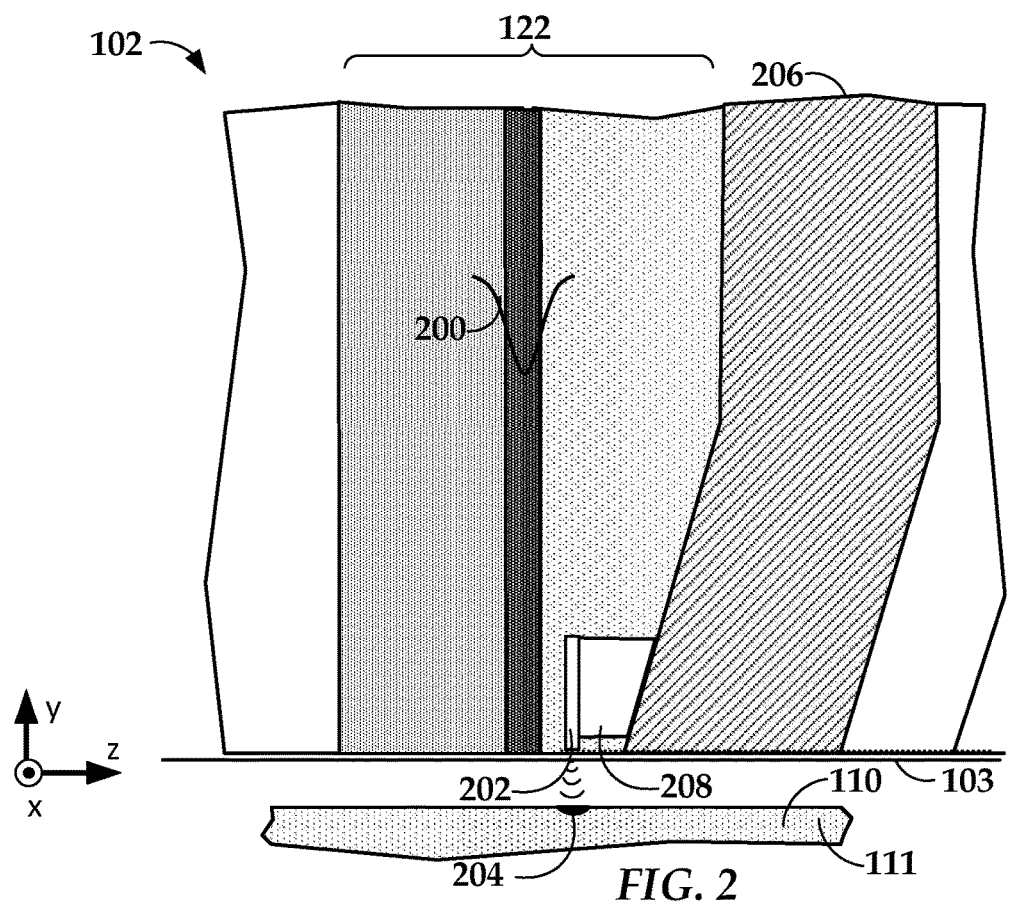
FIG. 2 is a cross-sectional view of a read/write head according to an example embodiment.

In FIG. 2, a block diagram illustrates a cross-sectional view of the HAMR read/write head 102 according to an example embodiment. The waveguide 122 receives electromagnetic energy 200 from the energy source, the waveguide 122 coupling the energy to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The energy 200 applied to the near-field transducer 202 to create the hotspot 204 can cause a significant temperature rise in local region. The near-field transducer 202 may include a heat sink 208 that draws away some heat, e.g., to the write pole 206 or other nearby heat-conductive component. Nonetheless, the temperature increase near the near-field transducer 202 can be significant, leading to local protrusion in the region of the write pole 206 and near-field transducer 202.

Figure 3:
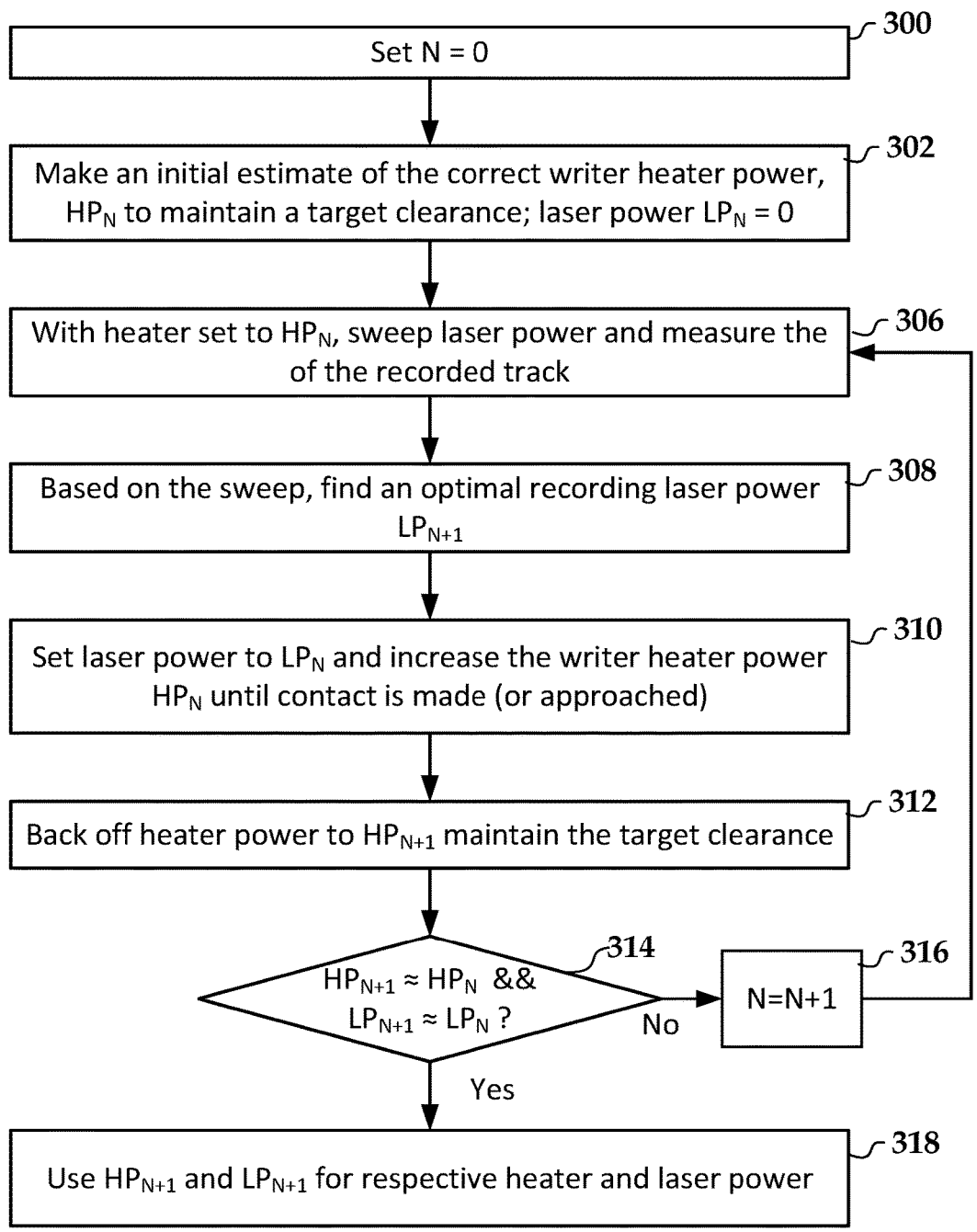
FIG. 3 is a flowchart of a procedure according to an example embodiment.

From head to head, there is may be significant variation in passive fly height, optical efficiency of the NFT and light path, and other variations that may affect dynamic fly height response. In such a case, the amount of protrusion from head to head due to thermal effects and the amount of laser power needed to optimally record will be different from head to head. In FIG. 3, a flowchart shows an example of a method for setting the laser power that corrects for these variations and ensures that a fixed clearance is maintained at the optimal laser power.

The method represented in FIG. 3 may be performed during qualification of a HAMR device, e.g., in the factory after manufacture. The method may also be performed post-manufacture, e.g., as part of a regular recalibration process, manually or automatically initiated to mitigate performance issues, etc. While the following procedure describes the setting and determination of laser and heater power, this may also encompass indirect estimates of power. For example, a controller may set power levels by changing one or both of a current and a voltage applied to the heater and laser. Generally, the values may be discrete values input to a digital-to-analog converter (DAC), which converts the discrete values to an analog voltage or current.

The procedure begins by initializing 300 a counting variable N used in subsequent iterations. An initial estimate of correct reader heater power $HP_N$ is made at block 302, and a laser power value $LP_N$ is initialized to zero. The initial heater power value $HP_N$ may be specific to certain conditions, such as a zone/region of the recording medium being tested, ambient temperature, rotation speed of the medium, etc. Both $HP_N$ and $LP_N$ will be determined during an iteration, and compared with corresponding $HP_{N+1}$ and $LP_{N+1}$ in subsequent iterations. As such, the procedure will involve storage of heater and power values from at least one previous iteration, and values for more iterations may also be stored, e.g., to calculate measures such as slope that indicate whether convergence is achievable.

At block 306, a series of data are recorded by sweeping through a laser power value (e.g., $LP_0$ to $LP_M$) and then reading back the data that was recorded at the different powers. The heater and laser power values may be discrete values input to a DAC, and so may sweeping through the laser power may involve incrementing a discrete DAC input value. In one embodiment, the laser power may be swept while recording a single track. In another embodiment, three tracks are written and the middle track is used as the reference track. With this method, the effects of adjacent track interference can be accounted for. In another embodiment, a whole track (or multiple tracks) can be written at one laser power level, read back, and then the process repeated at a different laser power levels over the same track(s) or equivalent tracks. As with the heater power, the range of laser power levels used in the sweep may be dependent on zone, temperature, and other factors.

At block 308, an optimal recording laser power is found. This optimal recording laser power may be based on one or more measurements made while reading back the recorded data, such as any combination of signal-to-noise ratio (SNR), bit error rate (BER), track average amplitude, track width, and overwrite performance. For example, if SNR is used, the optimum laser power may correspond to any combination of a peak SNR, target change in slope of SNR, SNR for tracks written at increasingly smaller pitch (e.g., squeezed SNR), etc. If BER is used, the BER may be measured for an isolated track and/or over multiple tracks. In the latter case, the laser power can be chosen that corresponds to minimum BER of a main track with two adjacent tracks written at a fixed pitch to simulate drive operational conditions.

In some cases, neither SNR nor BER may be directly available, and so other measurements may be made and analyzed at block 308. For example, track average amplitude or track width may be used. If track width is used, laser power may be increased until a desired track width is achieved. Track width can be measured by scanning the reader over a written track, e.g., reading the track at various crosstrack offsets either side of the track center. The width may be defined, for example, as the 50% amplitude point on both sides of the track centerline. In another example where neither SNR nor BER are directly available, servo error rate may be used instead to determine optimal recording power. Servo error rate is the error rate of the sync mark in tracks which are stitched together during the writing process. This may be considered a single-sided squeeze metric.

In some systems, like servo copy in a drive, neither SNR nor BER are available. With servo copy, a seed pattern is written by a specialized manufacturing machine. The drive then uses this seed pattern to fill in the missing servo patterns needed by the drive. In this case, the signal from the servo variable gain amplifier (VGA) can be used to determine optimal recording power. When a servo sync signal is written between the servo marks and user data sectors, the signal is first adjusted using the servo automatic gain control plant. A signal which is written weakly requires more gain from the VGA. As laser power is increased, less gain is required. The VGA gain can be used to pick the optimal laser power at block 308, e.g., laser power that corresponds to a minimum value of VGA gain.

In other embodiments, an overwrite signal can be used as a metric for determining an optimal laser power. Overwrite generally involves writing a tone at a first frequency and then immediately over write that data at a second, different frequency. When the signal is read it back, it is analyzed to determine components of each frequency, and in particular how much of the first frequency can still be read. The quality of the recording is inversely related to how much of the first frequency is still present, e.g., the amplitude of the first frequency component. It will be understood that any available measures described herein to determine optimum laser power may be used in combination, e.g., each being a weighted contribution to an overall score, the optimum laser power being the one with the best score.

At block 310, the laser is set to the optimum laser power, which is designated as $LP_{N+1}$ to differentiate it from either the initial $LP_0$ or $LP_N$ if this is not the first iteration (N>0). Also at this block 310, heater is increased until head-to-medium contact is detected, or until a suitably small clearance is detected just before contact. Contact can be detected by using an acoustic emission (AE) detector, which detects vibrations resulting from the contact. Other contact and/or clearance detection schemes may be used, such analyzing a thermal profile detected by a thermal sensor located near the media-facing surface of the read/write head. In another embodiment, contact and/or clearance can be detected based on position error sensor (PES) signals. For example, when the head contacts the medium, it may skip to the left or right, resulting in a jump in the PES signal. This block 310 may be performed in every zone or a subset of zones, and so a contactless detection process may be preferred to minimize damage to the read/write head.

At block 312, heater power is backed off by a particular amount to maintain the target clearance using the optimum laser power $LP_{N+1}$ for this iteration. The heater power so obtained is considered an optimum heater power for the iteration and is designated $LP_{N+1}$ for this iteration. For example, the optimum heater power $LP_{N+1}$ may be obtained by reducing the contact or near-contact heater power by a predetermined amount known to induce a desired negative displacement. In other cases, the heater power may be gradually reduced while actively measuring clearance until the desired clearance is reached. In such a case, a heater power that results in the desired clearance is saved as the new optimum heater power $LP_{N+1}$.

At block 314, the current optimum heater and laser power are compared are both compared (e.g., by subtraction, comparison of discrete DAC values, etc.) to previous optimum heater and laser power, and if their difference is greater than a threshold amount (which may be zero), then the counter N is incremented at block 316 and the next iteration begins at block 306. If the difference is less or equal to the threshold, then the last used heater and laser power are prepared for use (e.g., stored in memory) for subsequent use in writing data, as indicated at block 318.

The procedure shown in FIG. 3 can be performed for each read/write head in a device, and performed over different zones of a recording medium. In a controlled test environment (e.g., qualification testing) other factors can also be varied while performing the tests, such as ambient temperature. For each combination of variables, an optimum heater and laser power may be determined, either through direct lookup of test results performed at the corresponding conditions, and/or via extrapolation of results performed at a subset of the conditions. The procedure may be performed during manufacture of the device and/or during operational use.

Figure 4:
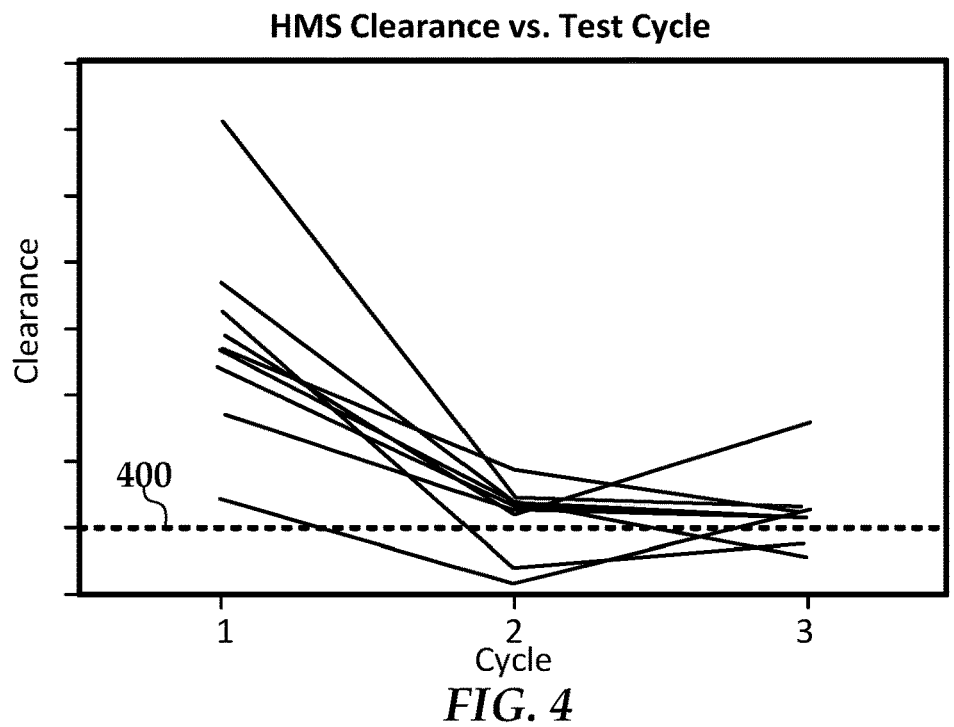
FIG. 4 is a graph showing results of a calibration procedure according to an example embodiment.

In FIG. 4, a graph illustrates results of the example procedure according to an example embodiment performed on a number of HAMR hard drive read/write heads. The number of iterations is on the x-axis and the clearance is on the y-axis. It has been found that, in most cases, the system can reach the optimal combination of laser power and heater power in as few as three iterations. The chart shows that initially there is a large distribution in writer clearance for each head but after three iterations of the method described above, nearly all head are writing at a fixed target clearance indicated by line 400. In these tests SNR was used to determine the optimum laser power during the laser power sweep part of the test.

Figure 5:
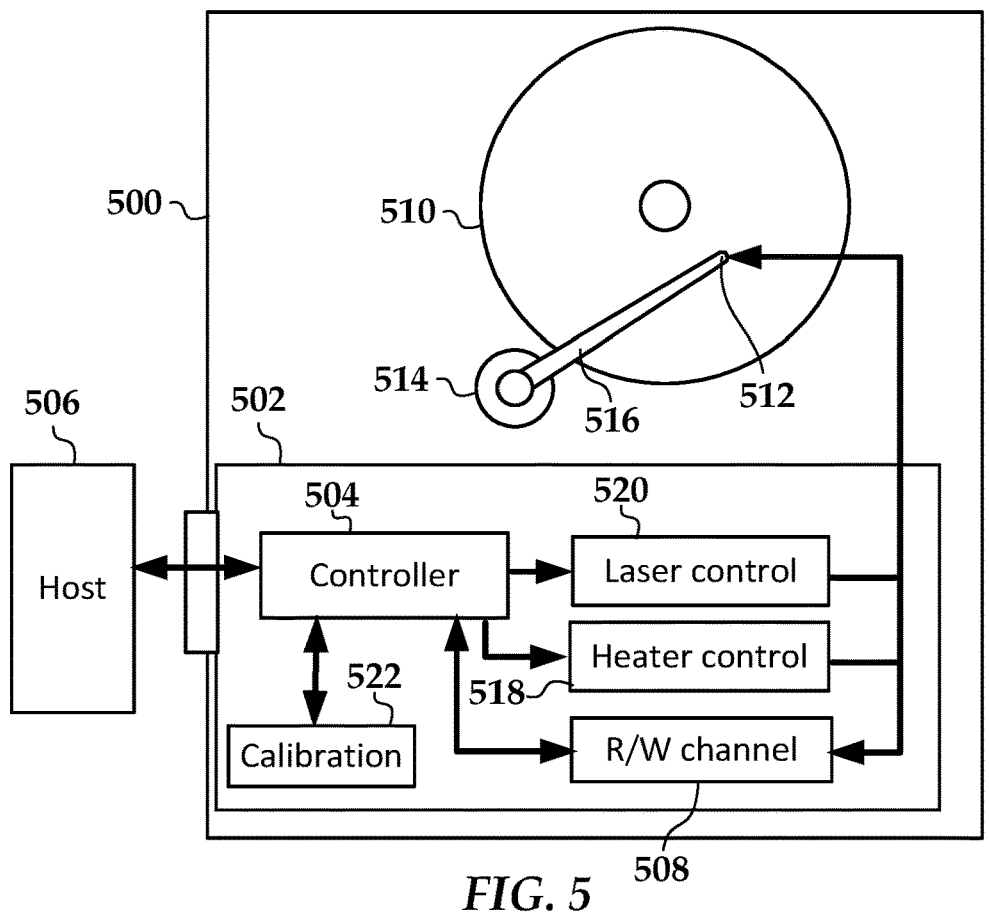
FIG. 5 is a block diagram of a system and apparatus according to an example embodiment.

In FIG. 5, a block diagram illustrates a data storage system according to an example embodiment. A data storage apparatus 500 includes logic circuitry 502 used to read data from and write data to one or more magnetic disks 510. The magnetic disks 510 are configured as a heat-assisted magnetic recording medium. The logic circuitry 502 includes one or more controllers 504 that perform operations associated with storing and retrieving data from the disks 510. The operations include processing read and write commands that originate from a host device 506. The host device 506 may include any electronic device that can be communicatively coupled to store and retrieve data from a data storage device, e.g., a computer, peripheral bus card, etc.

The controller 504 is coupled to a read/write channel 508 that processes data read from and written to the magnetic disk 510. The read/write channel 508 generally converts data between the digital signals processed by the controller 504 and the analog signals conducted through one or more read/write heads 512 (also referred to as a recording head). The read write heads 512 are positioned over the magnetic disk 510 via a servo motor 514 (e.g., voice coil motor) that moves one or more arms 516 to which the read/write heads 512 are mounted.

During read and write operations, a heater control circuit 518 sends power to one or more heaters of the read/write head 512. The heater control circuit 518 may include a DAC, preamplifier, filters, etc., that control and condition signals send to the reader heaters, which are used to adjust dynamic HMS between the read/write head 512 and disk 510. The controller 504 may receive feedback signals (not shown) that assist in controlling the heater, such as temperature readings from a head-mounted thermal sensor, AE detection, etc.

During write operations, a laser control circuit 520 sends power to one or more lasers (or similar thermal energy producing devices) of the read/write head 512. The laser control circuit 520 may include a DAC, preamplifier, filters, etc., that control and condition signals send to the lasers, which are used energize a near-field transducer that creates a hotspot on the disk 510 during recording. The controller 504 may receive feedback signals (not shown) that assist in controlling the laser, such as intensity readings from a head-mounted photodiode, etc. The laser control circuit 520 may adjust laser power to different levels during writing. For example, when traversing servo marks on the disk 510, the laser may be kept at a bias current that keeps the laser active but does not cause the laser to emit enough energy to heat the disk 510 to the Curie temperature, thereby preventing corruption of data stored in the servo marks.

The controller 504 may access a persistent storage to access instructions and data used in operating the apparatus 500. The persistent storage may include any combination of the primary storage medium (the disk 510 in this case) and local non-volatile solids-state data storage media, such as flash memory. One example of instructions and data that may be stored is represented by calibration module 522.

The calibration module 522 includes instructions that cause the controller 504 to perform a calibration procedure. The procedure involves setting (e.g., via the heater controller 518) a heater power of the heat-assisted magnetic recording head 512 to an initial power. Thereafter, a plurality of iterations are performed on the data storage apparatus 500. The iterations involve varying a laser power of the recording head 512 while writing data to at least one track of a recording medium 510 at the heater power. An optimum laser power is determined based on reading the data. During each iteration, an additional heater power is applied to cause a head-medium contact clearance at the optimum laser power. A heater power for the next iteration is set based on an offset from the additional heater power.

During the iterations, a first difference in the heater power is determined between two subsequent iterations. A second difference between the optimum laser power between two subsequent iterations also determined. If the first difference is below a first threshold and the second difference is below a second threshold, the iterations are stopped. The heater power and the optimum laser power for the last iteration are used as an operational heater power and an operational laser power for the heat-assisted magnetic recording head 512. The values of the operational heater power and the operational laser power may be stored on the apparatus 500, e.g., in non-volatile data storage. It will be understood that some or all of the instructions that cause the controller to perform the calibration procedure may be provided from an external source. For example, the host 506 may be configured as a testing device that directs the calibration procedure as part of qualification testing.

Figure 6:
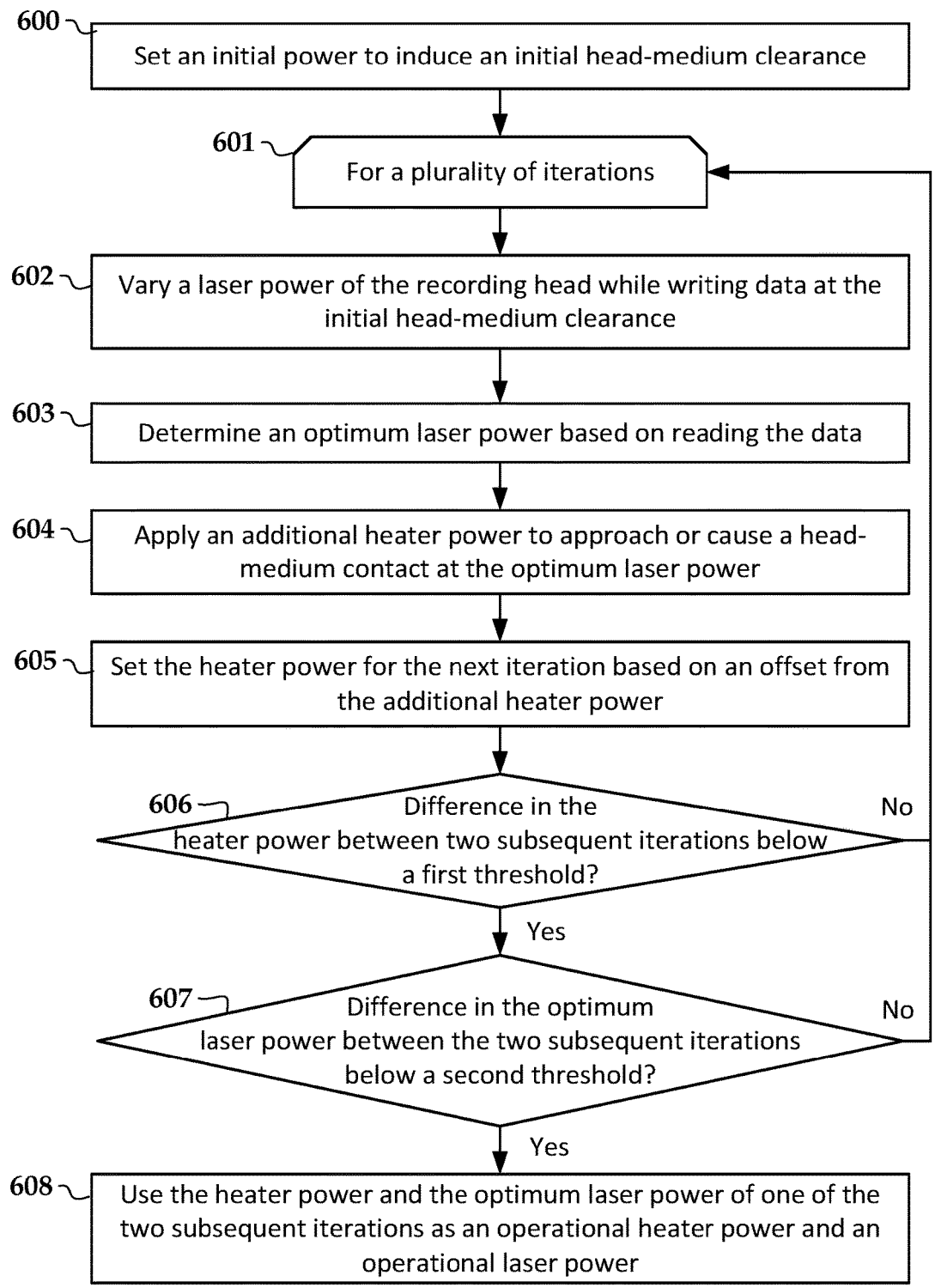
FIG. 6 is a flowchart of a method according to an example embodiment.

In reference now to FIG. 6, a flowchart illustrates a method according to an example embodiment. The method involves setting 600 a heater power of a heat-assisted magnetic recording head to an initial power to induce an initial head-medium clearance. A plurality of iterations are performed, as indicated by block 601. For each iteration, a laser power of the recording head is varied 602 while writing data to at least one track of a recording medium at the initial head-medium clearance. An optimum laser power is determined 603 based on reading the data. The optimum laser power may be determined 603 based on any combination of: a signal-to-noise ratio of the at least one track; a bit-error rate of the at least one track; a bit-error rate of multiple adjacent tracks; a servo error rate of the at least one track a servo variable gain amplifier gain while reading back the at least one track; a width of the at least one track; and an amplitude of the at least one track.

An additional heater power is applied 604 to approach or cause a head-medium contact at the optimum laser power. In a case where the additional heater power causes the head-medium contact at the optimum laser power, the detecting the head-medium contact may be based on acoustic emissions resulting from the head-medium contact. In a case where the wherein the additional heater power causes and approach to the head-medium contact (but does not cause contact) at the optimum laser power, the additional heater power may be based on a head-to-medium clearance that is detected before the head-medium contact occurs. In either case, the heater power is set 605 for the next iteration based on an offset from the additional heater power.

It is determined 606 whether a first difference in the heater power between two subsequent iterations is below a first threshold and also determined 607 whether a second difference in the optimum laser power between the two subsequent iterations is below a second threshold. If both determinations 606, 607 are positive, the iterations stop and the heater power and the optimum laser power for one of the two subsequent iterations are used 608 respectively as an operational heater power and an operational laser power for the heat-assisted magnetic recording head.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   setting a heater power of a heat-assisted magnetic recording head based on an initial head-medium clearance estimate in response to the heater power;
   for a plurality of iterations:
   determining an optimum laser power of the recording head based on writing data to at least one track of a recording medium at the heater power;
   applying an additional heater power to approach or cause a head-medium contact at the optimum laser power; and based on the value of the additional heater power, setting the heater power for a next iteration that results in an optimum heater power for the optimum laser power;

wherein, if a first difference in the heater power between two subsequent iterations is below a first threshold and a second difference in the optimum laser power between the two subsequent iterations is below a second threshold, stopping the iterations and using the optimum heater power and the optimum laser power for one of the two subsequent iterations as an operational heater power and an operational laser power for the heat-assisted magnetic recording head.

2. The method of claim 1, wherein setting the heater power for the next iteration comprises backing off from the additional heater power by a predetermined amount known to induce a desired negative displacement.

3. The method of claim 1, wherein setting the heater power for the next iteration comprises gradually reducing the additional heater power while actively measuring clearance until a desired clearance is reached.

4. The method of claim 1, wherein the optimum laser power is determined based on a signal-to-noise ratio of the at least one track.

5. The method of claim 1, wherein the optimum laser power is determined based on a bit-error rate of one or more tracks.

6. The method of claim 1, wherein the optimum laser power is determined based on a servo error rate of the at least one track.

7. The method of claim 1, wherein the optimum laser power is determined based on a servo variable gain amplifier gain while reading back the at least one track.

8. The method of claim 1, wherein the optimum laser power is determined based on at least one of a width or amplitude of the at least one track.

9. The method of claim 1, wherein the optimum laser power is determined based on an amplitude of an overwrite signal.

10. The method of claim 1, wherein the method is performed during operational use of the heat-assisted magnetic recording head.

11. An apparatus comprising:
interface circuitry operable to communicate with a heat-assisted magnetic recording head; and
a controller coupled to the interface circuitry and configured to perform, via the interface circuitry, a procedure that involves:
setting a heater power of a heat-assisted magnetic recording head based on an initial head-medium clearance estimate in response to the heater power;
for a plurality of iterations:
determining an optimum laser power of the recording head based on writing data to at least one track of a recording medium at the heater power;
applying an additional heater power to approach or cause a head-medium contact at the optimum laser power; and
based on the value of the additional heater power, setting the heater power for a next iteration that results in an optimum heater power for the optimum laser power;
wherein, if a first difference in the heater power between two subsequent iterations is below a first threshold and a second difference in the optimum laser power between the two subsequent iterations is below a second threshold, stopping the iterations and using the optimum heater power and the optimum laser power for one of the two subsequent iterations as an operational heater power and an operational laser power for the heat-assisted magnetic recording head.

12. The apparatus of claim 11, wherein setting the heater power for the next iteration comprises backing off from the additional heater power by a predetermined amount known to induce a desired negative displacement.

13. The apparatus of claim 11, wherein setting the heater power for the next iteration comprises gradually reducing the additional heater power while actively measuring clearance until a desired clearance is reached.

14. The apparatus of claim 11, wherein the optimum laser power is determined based on a signal-to-noise ratio of the at least one track.

15. The apparatus of claim 11, wherein the optimum laser power is determined based on a bit-error rate of one or more tracks.

16. The apparatus of claim 11, wherein the optimum laser power is determined based on a servo error rate of the at least one track.

17. The apparatus of claim 11, wherein the optimum laser power is determined based on a servo variable gain amplifier gain while reading back the at least one track.

18. The apparatus of claim 11, wherein the optimum laser power is determined based on at least one of a width or amplitude of the at least one track.

19. The apparatus of claim 11, wherein the optimum laser power is determined based on an amplitude of an overwrite signal.

20. The apparatus of claim 11, wherein the procedure is performed during operational use of the apparatus.

* * * * *